July 28, 1953
C. B. PEAR, JR
2,647,234
CLOUD DETECTING SYSTEM
Filed Jan. 19, 1951
3 Sheets-Sheet 1
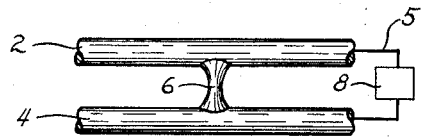
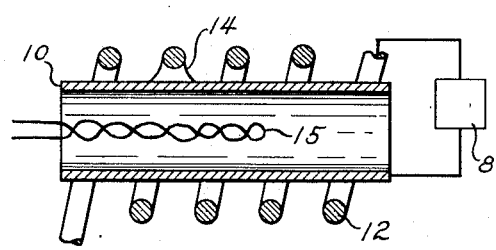
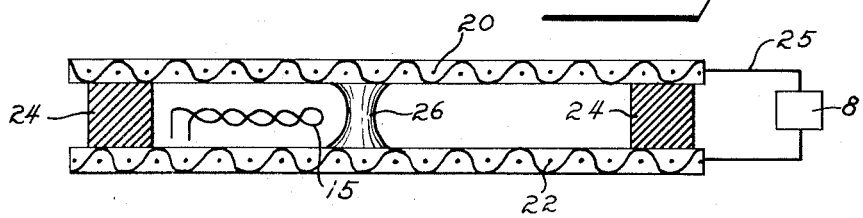
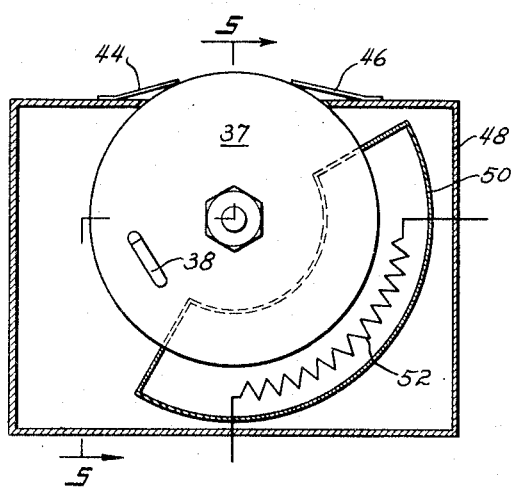
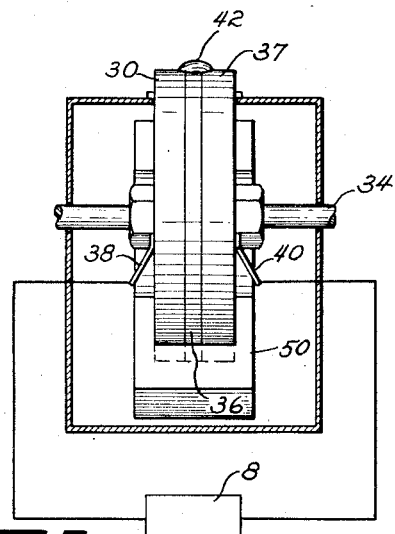
INVENTOR
CHARLES B. PEAR, JR.
BY Scrivener & Parker
ATTORNEYS July 28, 1953  C. B. PEAR, JR  2,647,234
CLOUD DETECTING SYSTEM
Filed Jan. 19, 1951  3 Sheets-Sheet 2

INVENTOR
CHARLES B. PEAR, JR.
BY Scrivener & Parker
ATTORNEYS

July 28, 1953

C. B. PEAR, JR 2,647,234

CLOUD DETECTING SYSTEM

Filed Jan. 19, 1951

INVENTOR
CHARLES B. PEAR, JR.

BY Scrivener + Parker

ATTORNEYS

Patented July 28, 1953

2,647,234

UNITED STATES PATENT OFFICE 2,647,234

CLOUD DETECTING SYSTEM

Charles B. Pear, Jr., College Park, Md., assignor to The Davies Laboratories, Inc., Riverdale, Md., a corporation of Maryland Application January 19, 1951, Serial No. 206,783

2 Claims. (Cl. 324—65)

This invention relates broadly to the art of determining meteorological conditions and, more particularly, to the determination of the presence of cloud, by which term is meant both aerial clouds and ground fog. As is well known, clouds are composed of very small droplets of water suspended in air. The human eye has heretofore been the most satisfactory means for determining the presence or absence of cloud as the eye can distinguish the light reflected from the droplets which form the cloud. It will be apparent, however, that the eye cannot be useful for cloud detection at night, nor can it accurately determine the altitude or thickness of a cloud bank, nor the presence of cloud at a place not available to the eye such as, for example, above a lower layer of clouds. All of these determinations are most desirable and necessary and are provided by the means which I have invented.

By this invention I have provided a means for determining the presence of cloud, which utilizes the electrical conductivity of water to energize the means which make the determination. Because of the very small size of cloud droplets I prefer to provide as part of the invention means for collecting the droplets into a drop of appreciable size which completes the electrical circuit between two electrodes which are normally out of electrical contact with each other. Various forms and arrangements of electrodes may be utilized and certain of these are disclosed in this application. In those forms of the invention which depend for their operation on the accumulation of a large drop of water it will be advantageous to accelerate the movement of cloud into contact with the detector in order to speed up the formation of a drop of sufficient size to permit detection, while in those embodiments whose operation is dependent on the completion of an electric circuit by a droplet, without accumulation of a large drop, acceleration of movement of the cloud into contact with the detector will also be advantageous in providing quicker operation and indication or signal. My invention provides means for effecting this acceleration and such means are useful without regard to whether operation is dependent upon accumulation of a large drop or upon impingement of only a droplet, without further accumulation. It will also be apparent that a useful cloud detecting instrument must be operable to sense the absence as well as the presence of water in order to indicate the passage of the detector out of a cloud, this being most important in determining cloud thickness. This result may be effected in a number of ways in accordance with the invention which are disclosed in this application.

The various objects and results of the invention which are set forth above are indicative of the general aspect and nature thereof. Various forms which the invention may take, among others, are described and illustrated in this application but the invention is not limited to the disclosed embodiments, as will be made apparent by the claims.

In the drawings forming part of this application,

Fig. 1 is a partly elevational and partly schematic illustration of a cloud detector and system according to the invention;

Figs. 2 and 3 show modified forms of electrode devices which may be used in place of that illustrated in Fig. 1;

Figs. 4 and 5 are side and end views, respectively, of a detector element having mechanical and electrical means for removing moisture;

Figure 6:
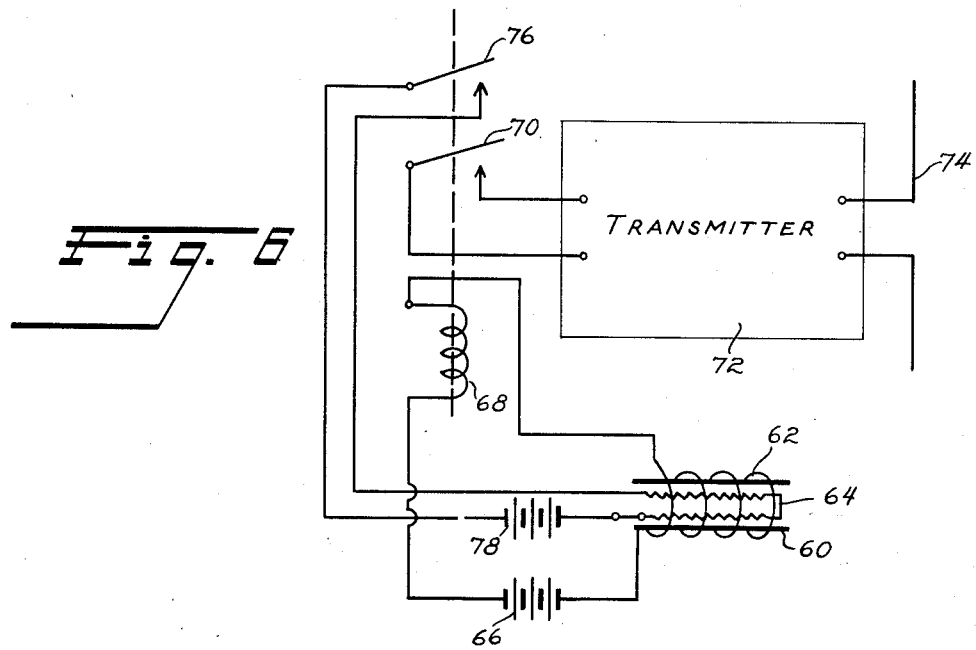
Fig. 6 is a circuit diagram of a detector system according to the invention.

My invention utilizes the greater electrical conductivity of water, with respect to air, to determine the presence in the air of droplets of water forming what is known as a cloud or fog. In accordance with the invention airborne water droplets are made to impinge on a collector and, by reason of the properties of surface tension, gravity or other means, to group themselves into a drop of sufficient size to bridge two normally separated electrodes, thus completing an electric circuit which may be utilized to operate any responsive device or circuit or provide any desired signal or control operation.

In order to combine the very small droplets, after collection on a surface of impingement, into one or more larger drops to facilitate electrical measurement, the impinging surface may be made of intersecting wires, as in a screen, so that surface tension will encourage the formation of larger drops at the intersecting points. Alternatively, the surface of impingement may be limited in area and reliance placed on the length of time of exposure, so that after a given number of droplets have struck the surface the probability will be high that in one or more spots several droplets will have fallen into contact with each other and, due to the surface tension, have formed one larger drop. In another case the surface of impingement may be so arranged that gravity, with or without the aid of the direction of motion of the air, will encourage the droplets to fall into a collection area of very small size, where the presence of many droplets will require the formation of one or more larger drops. Other means of combination may be employed, granted the presence of the small droplets on a surface which they have struck.

The basic combination of elements in accordance with my invention is disclosed in Fig. 1 and comprises two separated but closely-spaced electrical conductors 2, 4 which are connected in an electric circuit 5 and normally maintain it in open or de-energized condition but which, when connected, as by a drop of water 6, complete the circuit to operate any responsive device or circuit or any desired signal or control means 8 or perform any other operation. The conductors must, of course, be so closely spaced that they may be bridged by a drop of water and, preferably, are so constructed or arranged that they tend to collect the droplets which form a cloud. The electrodes may take any one of many forms and typical forms are illustrated in Figs. 1, 2 and 3. That of Fig. 2 comprises a tube 10 surrounded by an uninsulated wire helix 12 which is spaced from the tube by such a distance that the two may be bridged by a drop of water 14. The tube and helix are formed of electrically conductive material and are connected in an electric circuit 13 including a responsive device or circuit such as the signal or operating circuit 8. In the embodiment illustrated in Fig. 3 the electrodes take the form of parallel screens 20, 22 which are separated and supported by insulators 24. The screens are formed of electrically conductive material spaced sufficiently closely to be bridged by a drop of water 26 and are connected in circuit 25 including responsive device or circuit 8. In all of the forms of electrodes according to my invention the electrodes provide surfaces on which the cloud droplets impinge successively until they coalesce to form a drop which bridges the space between the electrodes.

It will be apparent that a useful instrument operable in accordance with the invention must be able to sense rapidly the absence as well as the presence of water droplets in order to determine, for example, the departure of the instrument from a cloud. In order to do this means must be provided to free the electrodes of accumulated water to break the electric circuit completed by the accumulation of droplets, it being understood that if the detector has not left a cloud accumulation will continue and the circuit will be completed again. One means of effecting the removal of water is to design the collection surfaces for a particular range of wind speed, so that the force of the air will carry the water away slightly less rapidly than it is deposited. A second method would be to utilize the self-heating effect of the electric current passing through the collected water drop to vaporize enough of the drop to break the electrical circuit in a suitably short time. Another means would utilize mechanical scraping to remove accumulated water. In a preferred embodiment the accumulated water is vaporized by heating the surface on which it is collected. Such a means is schematically shown in Figs. 2 and 3, in which an electric heating element 15 is provided adjacent one or both of the electrodes and is so operated that heat therefrom is sufficient to cause any drop 14 or 26 to be vaporized within a short period of time after accumulation. Obviously, the heating element will be energized only upon completion of the principal electric circuit by accumulation of the drop 14, thus normally permitting the accumulation to take place.

In Figs. 4 and 5 there is disclosed a detector incorporating mechanical and electrical means for removing accumulated water from the electrodes. In this embodiment the detector elements comprise two concentric drums 30, 37 mounted rigidly on a rotatable shaft 34 and separated by a thin strip 36 of insulating material. The drums are connected through brushes 38, 40 and appropriate leads to the circuit of a suitable signaling or control circuit which includes the responsive device or circuit 8. The insulating strip 36 is of such thickness that it may be bridged by a drop of water 42 to complete the electric circuit between the electrodes 30, 31. As shown in Fig. 5 one or more scrapers 44, 46 may be supported by an enclosing casing 48 and engage the surface of the electrodes and insulating means to remove water therefrom. Alternatively, or in addition, a heating chamber 50 may be provided within the casing 48, which closely surrounds a part of the drum formed by the electrodes and insulation, and within this heating chamber there may be an electric heating element 52 which vaporizes drops of moisture which have accumulated on the surface of the drum. The heater 52 will, of course, be made operative only on completion of the principal circuit by a drop 42, whereby the device is normally in condition to permit formation of a drop in the manner described. It will be understood that the shaft 34 and the electrodes and insulating means carried thereby are rotated upon completion of the principal circuit by deposit of a drop 42 and otherwise remain stationary.

In Fig. 6 of the drawings there is disclosed the schematic circuit diagram of a complete cloud detector system according to the invention. The detector element of this system may be formed in any desired construction, for example one of those illustrated in Figs. 1, 2 and 3, and is shown as comprising a tube 60 having a wire helix 62 wound about it, and having a heater 64 within it adapted to heat rapidly upon completion of contact between the tube and helix by accumulation of a drop of water bridging the gap between the two. The tube 60 and helix 62 are connected through battery 66 to the opposite terminals of a relay 68 which is therefore energized when the tube and helix are connected by a drop or droplet of water. Operation of the relay upon establishment of contact between the tube and helix operates one relay arm 70 to closed position to energize transmitter 72 causing it to radiate a signal through antenna 74, or affecting the modulation of a signal constantly radiated by the antenna, or otherwise providing a signal or change of signal. A second relay arm 76 is simultaneously operated to close a circuit including battery 78 and heater 64, thus energizing the heater.

Figure 7:
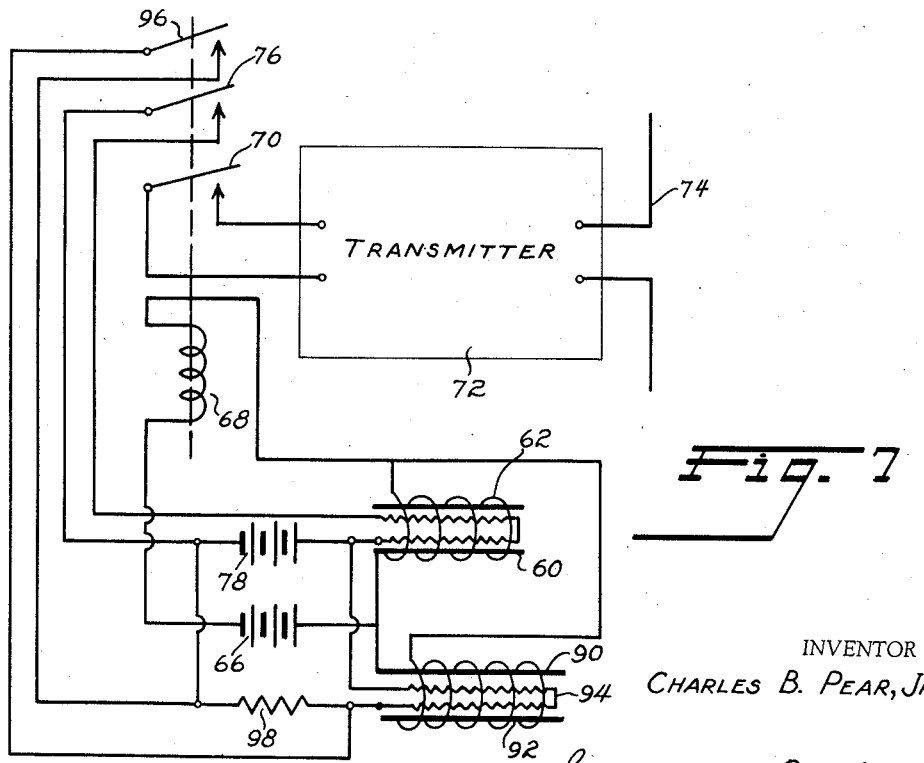
Fig. 7 is a circuit diagram of a detector system incorporating two sensing elements.

A system incorporating all of the features of that of Fig. 6 and, in addition, being capable of detection of clouds composed of supercooled water which would freeze instantly on contact with the detector electrodes or ice crystals is disclosed in Fig. 7. In this system a second detector is added having the tube electrode 90, wire helix electrode 92, and heater 94, which is constantly energized by battery 78. A third relay arm 96 is provided and is operated upon completion of contact between electrodes 60, 62 as described above. Operation of relay arm 96 removes resistor 98 from the circuit of battery 78 and heater 94, thus increasing the heating effect of heater 94. The detector 60, 62 will be operative with respect to normal clouds which are not formed of supercooled water or snow, while detector 90, 92 will normally be heated to such a temperature as to melt snow or supercooled water which may impinge thereon. The additional heating effect of heater 94 caused by removal of resistor 98 from its circuit will cause vaporization of water deposited on the electrodes in the manner and for the purpose described hereinbefore.

Figure 8:
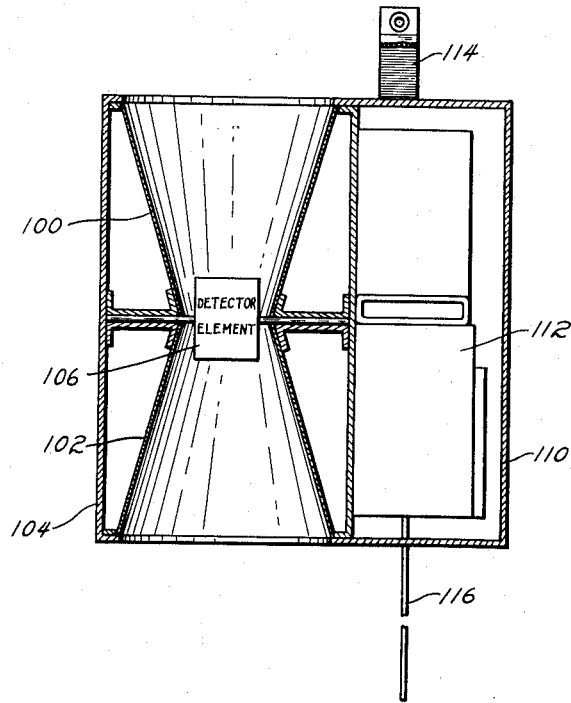
Fig. 8 is a part sectional and part schematic view of a device for accelerating the movement of cloud to the detector element, and for supporting the element and associated parts.

Means are provided by the invention for accelerating the movement of cloud to and into contact with the detector element in order to hasten the response of the system to a cloud which it may encounter. One embodiment of means for effecting this is disclosed in Fig. 8 and comprises an arrangement of two hollow, frusto-conical, open-ended members 100, 102 mounted in a supporting casing 104 in axial alignment with their small ends together. The detector element 106, of any desirable form, is mounted within the smallest part of the passage so formed whereby air and cloud entering either of the enlarged, open ends of the passage will pass over the detector element and leave the passage through the other open end, thereby causing a greater amount of air or cloud to pass over the detector than would be the case in the absence of the funnel-like passage in which the detector is mounted. The box or casing 104 may have a compartment 110 within which may be housed the elements 112 of the electric circuit energized by the detector element 106. A strap or other means 114 may be provided at the upper part of the box to attach the same to a balloon or other device for lifting it, and an antenna 116 may depend from the casing to radiate a signal the modulation of which is affected by energization of the circuit upon completion of a circuit through the detecting means by accumulation of a drop of water.

While I have described and illustrated certain forms which any invention may take, it will be apparent to those skilled in the art that other embodiments, as well as modifications of those disclosed, may be made and practised without departing in any way from the spirit or scope of the invention, for the limits of which reference must be had to the appended claims.

What is claimed is:

1. A device for detecting the presence of a cloud of minute droplets of water, comprising two co-axial closely spaced rotatable drums, an annulus of insulating material connected to and spacing said drums and being of sufficiently small width to be bridged by a drop of water contacting said drums, signalling means, a normally open circuit including said drums and said signalling means and adapted to be completed by a drop of water bridging said insulating means and contacting said drums, heating means for vaporizing a drop of water bridging said insulating means and contacting said drums, and means for scraping moisture from the peripheral surfaces of said drums and insulating means.

2. A device for detecting the presence of a cloud of minute droplets of water, comprising a casing, two closely spaced co-axial drums rotatably mounted in said casing, insulating material disposed between said drums and being of sufficiently small width to be bridged by a drop of water in contact with both said drums, scraping means carried by said casing and engaging the peripheral surfaces of said drums and insulating material for removing drops of water therefrom, signalling means, means adjacent said drums for heating the same to vaporize moisture thereon, and a normally open electrical circuit including said drums, said heating means and said signalling means and adapted to be closed by a drop of water bridging said insulating means and contacting said drums.

CHARLES B. PEAR, Jr.

References Cited in the file of this patent

UNITED STATES PATENTS

| Number | Name | Date |
|---|---|---|
| 2,047,638 | Kott | July 14, 1936 |
| 2,171,329 | Boone | Aug. 29, 1939 |
| 2,424,735 | Boothroyd | July 29, 1947 |
| 2,492,768 | Schaefer | Dec. 27, 1949 |

FOREIGN PATENTS

| Number | Country | Date |
|---|---|---|
| 509,982 | Germany | Oct. 15, 1930 |
| 557,614 | Great Britain | Nov. 29, 1943 |